Feb. 27, 1923.

A. J. BORST, Jr,
TRACTION DEVICE FOR VEHICLE WHEELS.
FILED DEC. 17, 1917.

Witness:
E. M. Schweiger.

Andrew J. Borst, Jr., Inventor,
By Emil Neuhart
Attorney.

Feb. 27, 1923.

A. J. BORST, Jr.
TRACTION DEVICE FOR VEHICLE WHEELS.
FILED DEC. 17, 1917.

Witness:
E. M. Schweiger.

Andrew J. Borst, Jr.,
Inventor.
By Emil Kuehart
Attorney.

Feb. 27, 1923.
A. J. BORST, Jr.
TRACTION DEVICE FOR VEHICLE WHEELS.
FILED DEC. 17, 1917.
1,446,870.
3 SHEETS—SHEET 3.
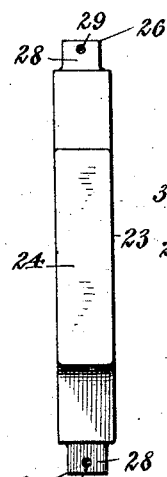
Fig. 6.
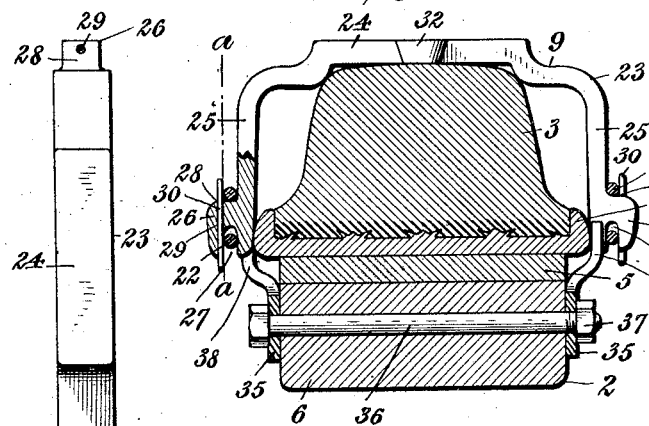
Fig. 7.
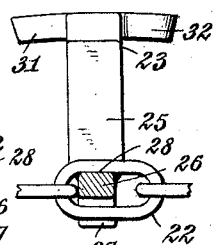
Fig. 8.
Fig. 9.
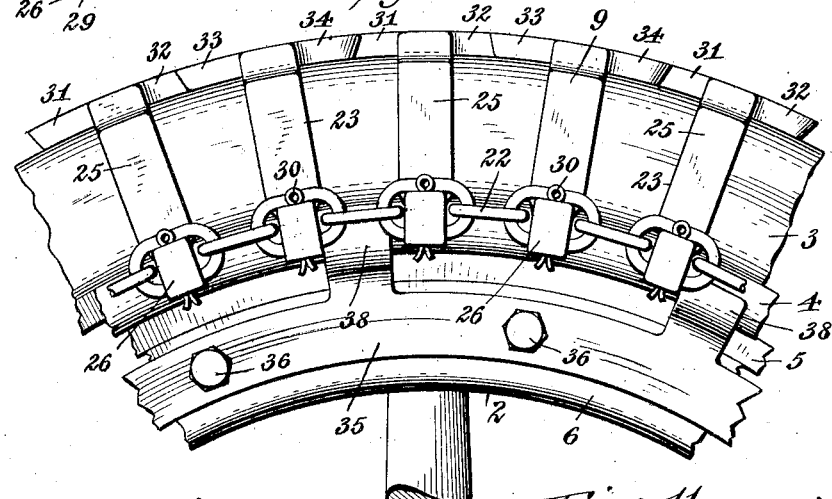
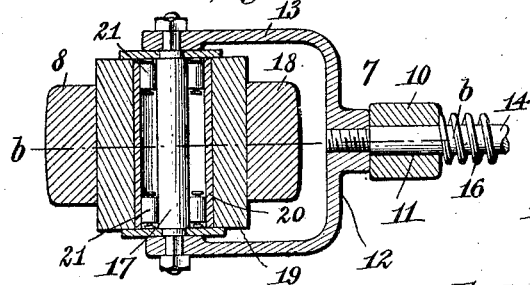
Fig. 10.
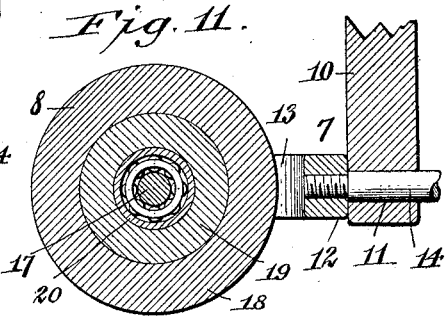
Fig. 11.
Witness:
E. M. Schweiger.
Andrew J. Borst, Jr., Inventor.
By Emil Neubart
Attorney.

Patented Feb. 27, 1923.

1,446,870

UNITED STATES PATENT OFFICE.

ANDREW J. BORST, JR., OF BUFFALO, NEW YORK.

TRACTION DEVICE FOR VEHICLE WHEELS.

Application filed December 17, 1917. Serial No. 207,490.

*To all whom it may concern:*

Be it known that I, ANDREW J. BORST, Jr., a citizen of the United States, residing at Buffalo, in the county of Erie and State of New York, have invented certain new and useful Improvements in Traction Devices for Vehicle Wheels, of which the following is a specification.

My invention relates to improvements in traction devices for vehicles, and it has for its primary object the provision of a simple and effective traction member adapted to be applied to a vehicle wheel and to pass around a yielding and self-tightening idler so that said traction member will be kept taut and in absolute physical contact with the tire of the wheel under all running conditions and so that it may yield when coming in contact with an obstruction in the road and at such times assist in lifting the vehicle wheel over the obstruction.

Another object of my invention is to provide a traction member for vehicle wheels which will, when the wheel enters a rut, tend to lift the wheel out of the rut.

A further object is to provide a traction member with a series of regularly spaced flexibly-connected U-shaped elements adapted, in the particular form shown, to straddle the tire of a vehicle wheel to the end that the member be securely retained on the wheel and so that a gripping surface is provided which is effective under all working conditions and particularly on smooth and slippery pavements.

A further object is to provide a traction belt and means for preventing slipping circumferentially of the belt around the vehicle wheel, and to otherwise improve on traction devices or attachments for vehicle wheels.

With these and other objects in view, the invention consists in the novel features of construction, in the arrangement and combination of parts to be hereinafter described and more particularly pointed out in the subjoined claims.

In the drawings,—

Fig. 6 is a plan view of one of the traction elements of the traction member showing still another form of traction element.

Figure 1:
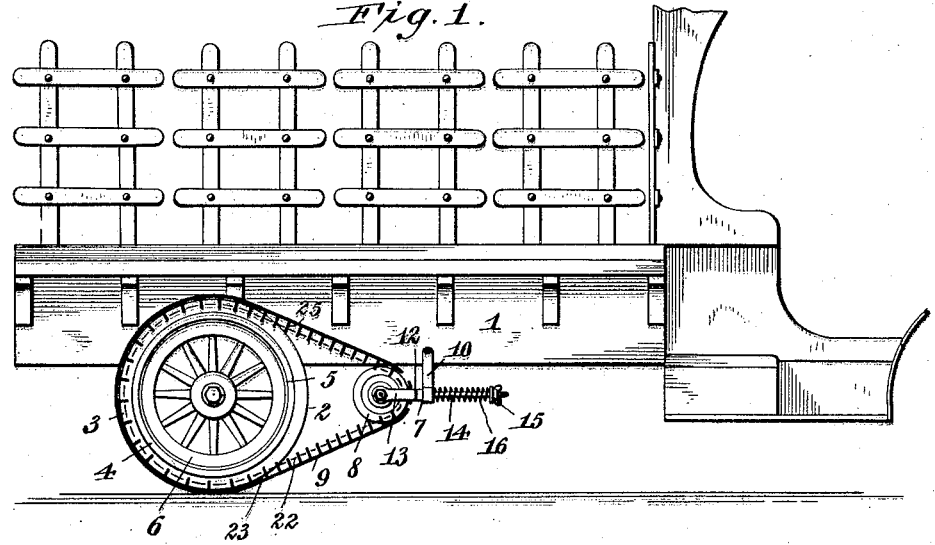
Fig. 1 is a side elevation of a portion of a truck with my improved traction attachment applied to one of the rear wheels thereof, there being a similar attachment on the wheel at the opposite side of the truck.

Fig. 7 is a transverse section through the tire rim and felloe of a wheel, showing one of the traction elements of the traction member in elevation with one extremity thereof in section, and showing also the flexible connector members between the traction elements of said traction member in section; also the means for preventing circumferential movement of the traction member around the tire of the vehicle wheel.

Fig. 8 is a vertical section taken on line *a—a*, Fig. 7.

Fig. 9 is a side elevation on an enlarged scale of a portion of the vehicle wheel and a portion of the traction member applied thereto.

Fig. 10 is a diametrical section through the idler around which the traction member passes.

Fig. 11 is a cross section taken on line *b—b*, Fig. 10.

In the drawings I have shown my invention in different scales. Some figures illustrate the application of my invention and their relation or arrangement with respect to other parts of the vehicle without showing the particular construction or entering into details of the same; while in others, parts of my invention are omitted for the sake of clearness. In some figures I have shown different forms of traction elements, all of said traction elements being, however, of the same general plan and coming fully within the principle involved.

1 represents the vehicle body which may be of any form or type, that shown in the drawings being a truck, as my invention is particularly adapted for trucks or similar vehicles.

2 designates the rear traction wheels, one arranged at each side of the vehicle body. These wheels may have any practicable form of tire, but I have shown a solid rubber tire 3 vulcanized to a metallic rim 4, as best shown in Fig. 7, this rim being pressed onto the felloe band 5 surrounding the wooden felloe 6. It is of course understood that my invention is adapted for use in connection with any other form of tire, that herein shown being, however, one common form.

Applied to the vehicle body directly in front of each of the wheels 2 is a tension device 7 including an idler wheel 8 around which wheel and the traction wheel 2, my improved traction belt or member 9 is arranged. Each tension device comprises a hanger 10 pivotally secured at one end to the vehicle body or some other fixed portion of the vehicle and provided with an opening 11 at its other end.

12 designates a support which is slidable within said hanger, it having a forked portion 13 at one end within which said idler wheel 8 is journaled. Extending centrally from said forked portion is a rod 14 which is slidable within the opening 11 of said hanger and extends forwardly a distance from said hanger, the front end of the rod being threaded and having a suitable nut 15, preferably a thumb nut, threaded thereon. Between the nut 15 and the hanger 10, a coil spring 16 is interposed, said spring surrounding the rod 14 and bearing at one end against said hanger and at its other end against said nut. The front end of the forked portion 13 bears against the rear edge or face of said hanger, due to the action of the spring 16. This spring may be placed under more or less tension by adjusting the nut 15 lengthwise on the rod 14. The idler wheel 8 may be mounted in the forked portion of the support in any suitable manner, but I preferably mount the same for rotation on a spindle 17 having its opposite ends fastened in the opposite extremities of said forked portion. Said idler wheel comprises three main parts or members 18, 19, 20, the first being a cast iron rim, the third a steel sleeve separated from the spindle 17 by an annular intervening space, and the second a wooden filler interposed between said cast iron rim and said steel sleeve. Between the spindle 17 and the steel sleeve, annular roller bearings 21 are interposed, which assure free rotary movement of the idler wheel on said spindle.

The traction member for each vehicle wheel comprises two endless chains 22 which are connected by my improved traction elements 23. Each traction element is substantially of U-shaped formation, as shown in Fig. 6, and is adapted to straddle the vehicle tire with or without its rim. The endless chains 22 lie at opposite sides of the tire and the traction elements are spaced apart with opposite extremities secured to said chains, each traction element comprising a cross or tread member 24 and two side or radial members 25. Each side or radial member is enlarged at its inner end, as at 26, and has a notch 27 extending outwardly from its inner end. By enlarging the inner end of the side or radial members 25, an outwardly facing shoulder 28 is provided, as clearly shown in Fig. 7. Alternate links of the flexible chain are arranged vertically while the links therebetween are arranged horizontally, the horizontal links being positioned between the enlarged inner extremities of adjacent traction elements while the vertical links are connected to said extremities, the upper bars of the vertical links being above and resting upon the shoulders 28 of said traction elements and the lower bars being entered in the notches 27 of said elements. With a view of securing these links in position on the traction members, each of the enlarged portions of said members is provided with an opening 29 through which a cotter pin 30 is passed. The heads or outer ends of said pins bear against the upper bars of the vertical links of each chain so that accidental removal of the links from the enlarged extremities of the traction members is impossible. The cross or tread members 24 of the traction elements lie in contact with the periphery of the tire, and those which happen to be in contact with the road surface are slightly embedded in the tire under the superposed weight. These cross or tread members are, however, either out of contact with said tire or rest only against the periphery of said tire at other points along the traction member.

Figure 2:
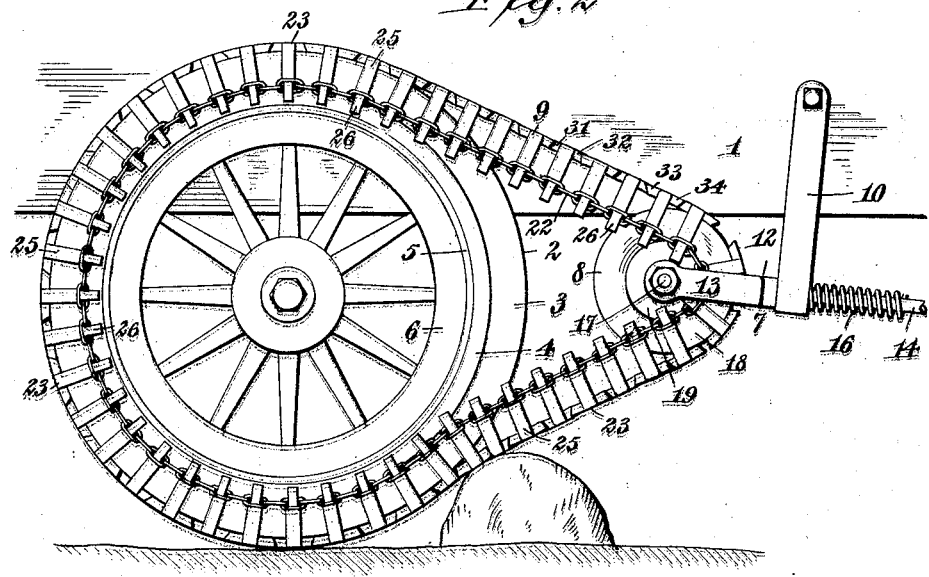
Fig. 2 is an enlarged side elevation of a vehicle wheel and the adjacent portion of a vehicle showing my improved attachment applied around said wheel and supported on said vehicle portion.

This construction provides a flexible endless traction belt or member which passes around the vehicle wheel and the idler wheel associated therewith, and in traveling along smooth roads said belt or member is held taut by the tension device 7, the idler wheel of which is drawn forward by the spring 16. When, however, the vehicle wheel enters a rut, or encounters an obstruction, such as shown in Fig. 2, the lower stretch of the traction belt or member extending forwardly from the vehicle wheel to the idler wheel is forced inwardly, as shown in Fig. 2, and under such conditions the idler wheel 8 is moved rearwardly, causing the hanger 10 to swing rearwardly with the same. When the hanger is swung rearwardly to a certain degree the rod of the support 12 moves within the hanger, causing compression of the spring 16. The tension device therefore accommodates itself to the strain applied to the lower stretch of the traction member and when said stretch is pressed inwardly, the tendency is to lift the wheel out of the rut or lift the same over the obstruction, as the case may be.

Figure 3:
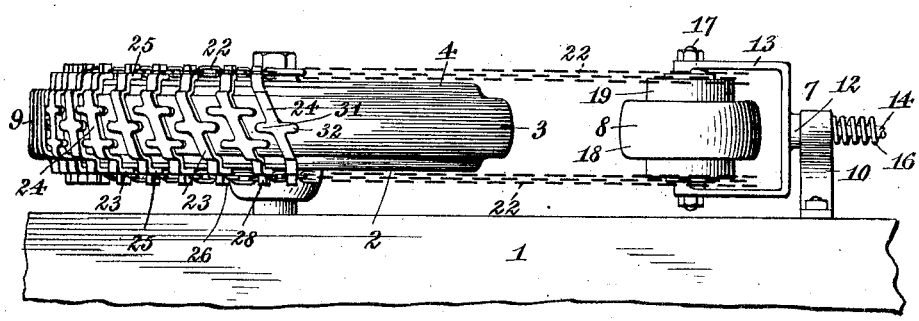
Fig. 3 is a plan view showing opposite vehicle wheels equipped with my improved attachment, the preferred form being therein shown and the portion of the vehicle between the wheels having part thereof broken away.
Figure 4:
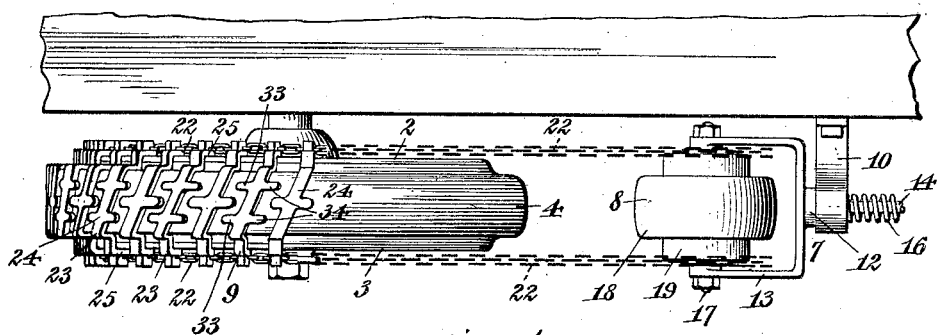
Fig. 4 is a plan view of a portion of the flexible traction member in what I consider its preferred form.
Figure 4:
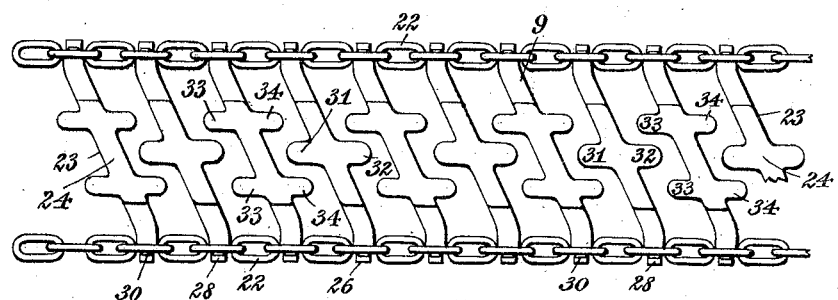

In the preferred and most effective form, the traction elements 23 are arranged obliquely, as shown in Figs. 3 and 4, the traction elements of the traction member at one side of the vehicle being arranged or inclined opposite to those of the traction member at the other side thereof so that a substantially "herring bone" effect is obtained. This is a very important feature of my invention, since the effect of the traction member against the road surface at one side of the vehicle is opposite that of the member at the other side thereof, the members tending to draw inwardly toward a medial line longitudinally through the vehicle body or to pull outwardly from said medial line, depending on the direction in which the traction elements are inclined. For this reason these traction elements may be inclined or arranged obliquely outwardly and rearwardly from the inside of the traction member, or inwardly and rearwardly from the outer side of the traction member, but in either case the traction elements at one side of the vehicle are inclined or arranged obliquely, opposite to the inclination or arrangement at the other side of the vehicle.

Figure 5:
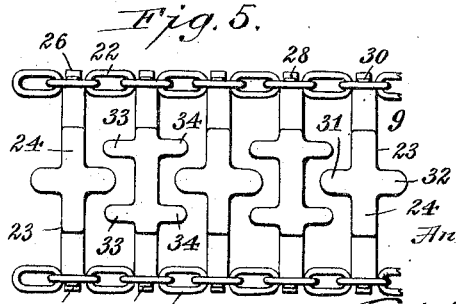
Fig. 5 is a similar view showing another form of traction member.

In Fig. 5 I have shown the traction elements arranged in direct transverse lines; that is to say, they are at right angles to the flexible chains or to the line of travel of the vehicle. Whether arranged obliquely as shown in Figs. 3 and 4 or at right angles to the line of travel of the vehicle, as shown in Fig. 5, said traction elements may have lateral extensions formed thereon, alternate traction members being each provided midlength thereof with a rearward extension 31 and a forward extension 32, and each of the traction elements therebetween are provided with two rearward extensions 33 and two forward extensions 34, the extensions 31, 32 entering the spaces between the two extensions 33 and the two extensions 34 of the intermediate traction members. This, in effect, provides a continuous bearing surface for the traction member and eliminates the noise and jarring of the vehicle necessarily caused where traction members are spaced apart without the traction surfaces being continued completely around the vehicle wheel. In other words, in the rotation of the vehicle wheel, the traction faces of the traction members are so arranged that tht extensions 32 are still in contact with the road surface while the extensions 29 therebetween are moved into contact with the road surface and so that the extensions 32 are still in contact with the road surface while the extensions 33 are moved into contact therewith. This is particularly desirable on hard surfaced roads, especially on cobble stone pavements, since it prevents the cobble stone entering between the main portions of said tread members, which would cause considerable noise and undue jarring of the vehicle.

When using a vehicle equipped with my invention mainly on soft roads, the traction members may be formed as shown in Fig. 6; that is, without the extensions 31, 32 or 33 and 34.

In Fig. 6 I have shown the tread members 24 of the traction elements formed without the extensions. In this case the traction elements are arranged in a line at right angles to the line of travel of the vehicle, but it is clear that oblique traction elements shown in Figs. 3 and 4 may be used without the extensions thereon.

In order to prevent slipping of the traction member on the vehicle wheel, retainer rings 35 may be secured to the felloe of the wheel at opposite sides thereof by means of bolts 36 passing through said rings and felloe and having nuts 37 threaded onto one of the ends thereof. Each of these retainer rings is provided at intervals with outwardly-extending lips 38 which enter the spaces between the extremities of the traction elements, as best shown in Fig. 9. The forward edges of the enlargements at the extremities of certain traction elements bear against said lips when the vehicle wheel is rotating in one direction and the rear edges of the enlarged extremities of certain traction elements bear against said lips when the wheel is rotating in the opposite direction, the lips being somewhat narrower than the space between the enlargements of two adjacent traction elements.

The tread members 24 and the extensions 31 and 32 or 33 and 34 thereof are preferably tapered inwardly at their edges so that when traveling over mud roads, or snow-covered roads, they will enter the mud or snow and draw out easily without the tendency of packing the mud or snow between the traction elements, the inwardly beveled edges of the extensions being clearly shown in Figs. 7, 8 and 9, and the tread member being similarly formed.

It is apparent from the foregoing, that many changes could be made in the above described construction, and therefore in accordance with the provisions of the patent statutes, I have described the principle of operation and use of my invention together with the construction which I now consider to represent the best embodiment thereof, but I desire to have it understood that widely different embodiments could be made without departing from the scope of this invention; it being intended that the above description and the accompanying drawings are to be considered illustrative of the invention and are not to be interpreted in a limiting sense.

Having thus described my invention, what I claim is,—

1. In a motor vehicle, the combination with a traction wheel, of a hanger pivotally secured to a portion of the vehicle, a supporting member slidably retained within said hanger, an idler wheel rotatable on said supporting member, a flexible traction member surrounding said traction wheel and said idler wheel, and means associated with said supporting member to maintain said traction member taut and to permit said supporting member to yield under undue pressure applied to said traction member at any point between said wheels.

2. In a motor vehicle, the combination with a traction wheel, of a hanger pivotally secured to a portion of the vehicle and depending from its point of pivotal connection thereto, a supporting member slidably arranged within the lower end of said hanger and having a rod extending forwardly therefrom, a nut adjustable on said rod, a coil spring surrounding said rod and bearing at opposite ends against said hanger and said nut, an idler wheel rotatable in said supporting member, and a traction belt surrounding said traction wheel and said idler wheel.

3. In a motor vehicle, the combination with a traction wheel, of a hanger pivotally secured at its upper end to a portion of the vehicle, a supporting member comprising a forked portion at one side of said hanger and a rod slidable in said hanger and projecting a considerable distance from the other side of said hanger, a nut adjustable on said rod, a coil spring surrounding said rod and bearing at opposite ends against said hanger and nut, an idler wheel rotatable in the forked portion of said supporting member, and a traction belt surrounding said traction wheel and idler wheel.

4. A traction belt comprising spaced rigid U-shaped traction members, each traction member comprising a tread portion and inwardly projecting arms at opposite ends of said tread portion, each of said arms being enlarged at its inner end and provided with a slot extending outwardly from its inner end, and an endless chain connecting opposite ends of said traction members, certain of the links of said chains fitting onto the enlargements of said arms with a portion thereof entered into the notches at the inner ends of said arms.

5. A traction belt comprising spaced U-shaped members having lateral enlargements at opposite ends and notches extending outwardly from opposite extremities, chains connecting the ends of said traction members together with a portion of certain links of the chain resting upon the outer faces of said enlargements and portions of said links entered into said notches, and cotter pins passed through said enlargements to retain the links in secured condition.

6. The combination with a vehicle wheel, of a traction belt comprising a plurality of rigid U-shaped traction members straddling the marginal portion of said wheel and being flexibly connected together at opposite ends, and a retainer ring secured to the felloe of said wheel and having outwardly projecting lips entered between the ends of adjoining traction members.

7. The combination with a vehicle wheel, of a plurality of spaced U-shaped traction members straddling the marginal portion of said wheel, means for flexibly connecting the ends of said members at opposite sides of the wheel, retainer rings secured to opposite sides of the wheel felloe and having means co-acting with said traction belt members to prevent slipping of the latter on said wheel.

8. The combination with a vehicle wheel, of a traction belt surrounding said wheel and comprising a plurality of spaced rigid U-shaped cross members straddling the marginal portion of the wheel, means at opposite sides of the wheel for flexibly connecting opposite ends of said members, and means rigidly connected to said wheel co-acting with said cross members to prevent slipping of the belt on the wheel.

9. The combination with a vehicle, of a plurality of U-shaped cross members straddling the marginal portion of the wheel and being flexibly connected together at opposite sides of the wheel, and retainer rings secured to the wheel felloe at opposite sides thereof and each having outwardly projecting lips entering the space between the ends of two adjoining cross members.

In testimony whereof I affix my signature.

ANDREW J. BORST, Jr.